United States Patent
Cho et al.

(10) Patent No.: US 8,770,118 B2
(45) Date of Patent: Jul. 8, 2014

(54) OXYGEN SUPPLYING APPARATUS OF A MELTING FURNACE

(75) Inventors: Hyun Je Cho, Daejeon (KR); Deuk Man Kim, Daejeon (KR); Seok Mo Choi, Daejeon (KR); Cheon Woo Kim, Daejeon (KR); Tae Won Hwang, Daejeon (KR)

(73) Assignee: Korea Hydro & Nuclear Power Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 13/466,294

(22) Filed: May 8, 2012

(65) Prior Publication Data
US 2013/0068420 A1    Mar. 21, 2013

(30) Foreign Application Priority Data
Sep. 19, 2011   (KR) .................. 10-2011-0094291

(51) Int. Cl.
*F23L 7/00*        (2006.01)
*C21B 7/16*        (2006.01)
(52) U.S. Cl.
USPC .................. 110/182.5; 110/258; 266/270
(58) Field of Classification Search
USPC ......... 110/237, 238, 297, 313, 346, 348, 157, 110/250, 182.5, 258; 266/265, 266, 267, 266/270
See application file for complete search history.

(56) References Cited

U.S. PATENT DOCUMENTS

| | | | | |
|---|---|---|---|---|
| 2,828,956 A | * | 4/1958 | Bieniosek et al. | 239/132.3 |
| 3,488,044 A | * | 1/1970 | Shepherd | 239/132.3 |
| 3,703,279 A | * | 11/1972 | Saccomano et al. | 266/268 |
| 3,976,238 A | * | 8/1976 | Sartorius | 266/265 |
| 4,023,676 A | * | 5/1977 | Bennett et al. | 266/268 |
| 4,434,976 A | * | 3/1984 | Murakami et al. | 266/268 |
| 4,449,701 A | * | 5/1984 | Pitzer et al. | 266/270 |
| 4,550,898 A | * | 11/1985 | LaBate, II | 266/270 |
| 4,792,126 A | * | 12/1988 | Nagy et al. | 266/270 |
| 4,941,646 A | * | 7/1990 | Stelts et al. | 266/270 |
| 5,443,572 A | * | 8/1995 | Wilkinson et al. | 110/237 |
| 6,428,603 B1 | * | 8/2002 | Batterham | 75/533 |

FOREIGN PATENT DOCUMENTS

| | | | |
|---|---|---|---|
| JP | 61-198253 U | 12/1986 | |
| JP | 10245618 A | * 9/1998 | ............... C21C 5/52 |
| JP | 2001-526320 A | 12/2001 | |
| JP | 2006-145543 A | 6/2006 | |
| KR | 20-0294861 Y1 | 11/2002 | |
| KR | 10-2003-0094612 A | 12/2003 | |
| KR | 10-0498881 B1 | 7/2005 | |
| KR | 10-0507893 B1 | 8/2005 | |
| KR | 10-2001-0101108 A | 11/2011 | |

* cited by examiner

*Primary Examiner* — Kenneth Rinehart
*Assistant Examiner* — Tavia Sullens
(74) *Attorney, Agent, or Firm* — Rabin & Berdo, P.C.

(57) ABSTRACT

An oxygen supplying apparatus of a melting furnace, in which waste contained within the melting furnace is stirred by using an oxygen supplying member of the melting furnace, includes an air cooling member provided in a through hole formed on the melting furnace and mounted on the oxygen supplying member to allow an outside air to enter thereto.

1 Claim, 2 Drawing Sheets

OXYGEN SUPPLYING APPARATUS OF A MELTING FURNACE

CROSS REFERENCE

This application claims the benefit under 35 U.S.C. §119 a of a Korean patent application filed in the Korean Intellectual Property Office on Sep. 19, 2011 and assigned Serial No. 10-2011-0094291, and the entire disclosure of which is hereby incorporated by reference.

BACKGROUND OF THE INVENTION

1. Field of the Invention

The present invention relates to an oxygen supplying apparatus of a melting furnace, and more particularly, to an oxygen supplying apparatus of a melting furnace, in which the oxygen supplying apparatus inserted to the melting furnace is cooled by using air cooling provided externally of the oxygen supplying apparatus, thereby improving durability to enable melting waste for longer time, and has a simple structure to minimize economic damage due to wear and tear.

2. Description of the Related Art

In a nuclear power plant, a protective clothing, PVC, vinyl sheet, waste, waste ion exchange resin, boric acid waste, slurry and a dried material that are produced during operation and maintenance of the nuclear power plant are placed altogether in a melting furnace that uses inductive current heating such that verified waste is generated to minimize an environmental impact as well as emission of a radioactive waste drum is reduced.

Generally, an oxygen supplying apparatus of a melting furnace is an apparatus used for vitrificating waste contained within the melting furnace.

Prior art documents include, for example, Korean Patent No. 10-0507893, tided "Method and Device for Incineration and Vitrification of waste, in particular Radioactive Waste," Korean Patent No. 10-0498881, titled "Treatment Apparatus for Destroying by Burning up and Melting Radioactive Waste and Method the Same," and Korean Utility Model No. 20-0294861, titled "Treatment Apparatus for Destroying by Burning up and Melting Radioactive Waste."

The above prior art documents discloses providing an oxygen supplying apparatus for supplying oxygen to a melting furnace, wherein water cooling is used to cool the oxygen supplying apparatus to prevent overheating.

However, the prior art oxygen supplying apparatus of the melting furnace has a problem in that the prior oxygen supplying apparatus is cooled by water cooling such that leakage occurs due to damage such as wear and corrosion.

In addition, the damage requires replacement, which increases processing time and costs, thus lowering reliability of the melting furnace.

SUMMARY OF THE INVENTION

Accordingly, the present invention has been made in view of the above problems, and the present invention is to provide an oxygen supplying apparatus of a melting furnace, in which the oxygen supplying apparatus inserted to the melting furnace is cooled by using air cooling provided externally of the oxygen supplying apparatus, thereby improving durability to enable melting waste for longer time, and has a simple structure to minimize economic damage due to wear and tear.

In one aspect of the present invention, an oxygen supplying apparatus of a melting furnace, in which waste contained within the melting furnace is stirred by using an oxygen supplying member of the melting furnace, comprises an air cooling member provided in a through hole formed on the melting furnace and mounted on the oxygen supplying member to allow an outside air to enter thereto.

In one embodiment, the oxygen supplying apparatus may preferably further comprises a fixing member mounted on an upper portion of the melting furnace and provided on an exterior surface of the air cooling member.

In one embodiment, the oxygen supplying member is preferably supported by a plurality of connection units positioned between the oxygen supplying member and the air cooling member.

In one embodiment, the oxygen supplying member is elongated along a longitudinal direction to be longer than the air cooling member.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Exemplary embodiments of the present invention will be described herein below with reference to the accompanying drawings.

Figure 1:
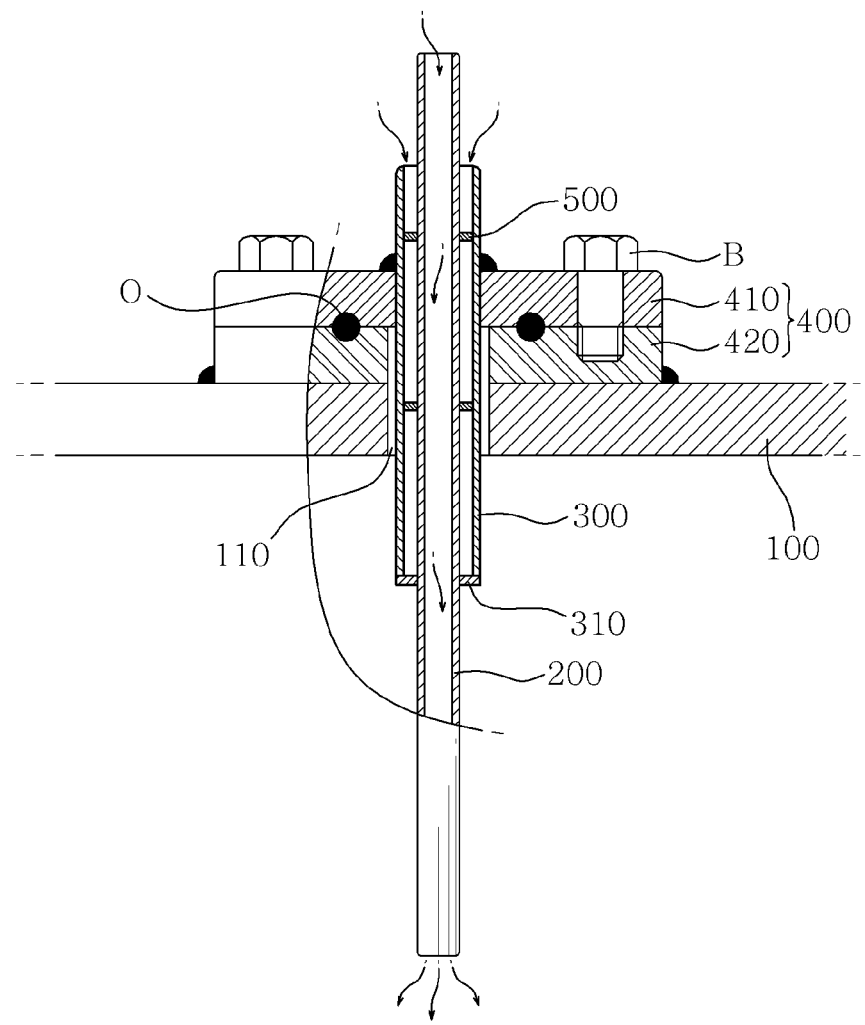
FIG. 1 is a front view illustrating a cross section of a part of an oxygen supplying apparatus of a melting furnace according to the present invention.
Figure 2:
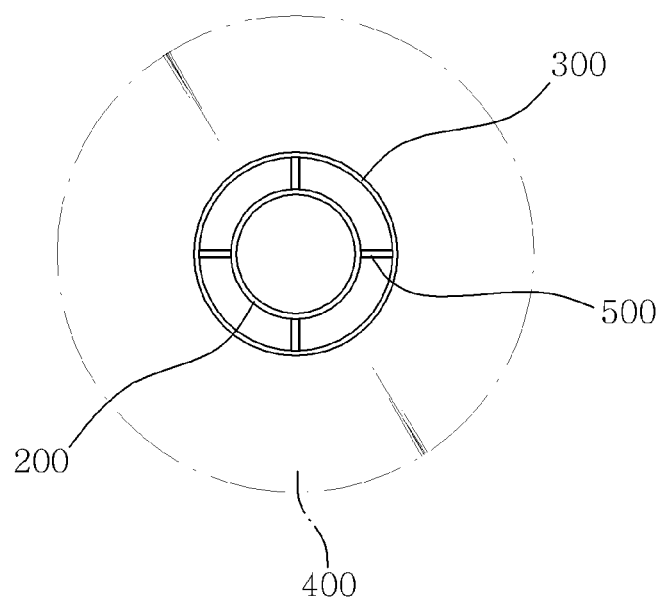
FIG. 2 is a plan view illustrating a connection unit provided between an air cooling member and an oxygen supplying member according to the present invention.

An oxygen supplying apparatus of a melting furnace according to the present invention is inserted within the melting furnace, as shown in FIG. 1, and a connection unit is provided between an air cooling member and an oxygen supplying member, as shown in FIG. 2.

As shown in FIG. 1, the oxygen supplying apparatus includes a melting furnace 100, an oxygen supplying member 200 and an air cooling member 300.

The melting furnace 100 is formed in a cylindrical shape to receive radioactive and non-radioactive waste therein.

Specifically, the melting furnace 100 includes a container for containing the waste to be melted and a cover for sealing the contained waste.

The melting furnace 100 is provided with the oxygen supplying member 200 to supply oxygen to improve combustion of the waste contained within the melting furnace 100 or generates a bubble in the waste contained within the melting furnace 100 to uniformly melt the waste.

The oxygen supplying member 200 is inserted to an interior of the melting furnace 100 by penetrating through a through hole 110 formed on the melting furnace 100, wherein a diameter of the oxygen supplying member 200 is formed to be smaller than that of the through hole 110.

Specifically, the oxygen supplying member 200 is formed to be elongated along a longitudinal direction to be longer than the air cooling member 300, which will be described below. A part of the oxygen supplying member 200 passes an upper portion of the air cooling member 300 to be exposed to an outside and another part of the oxygen supplying member 200 inserted to the interior of the melting furnace 100 passes a lower portion of the air cooling member 300.

The oxygen supplying member 200 may be formed in a shape of a pipe that is open at both ends and comprise stainless steel.

Accordingly, the waste received in the melting furnace 100 may be stirred by the oxygen supplying member 200, thereby increasing a processing capacity.

The air cooling member 300 is provided in the through hole 110 formed on the melting furnace 100 and mounted on the oxygen supplying member 200 to allow an outside air to be entered thereto.

Specifically, the air cooling member 300 is formed to have a diameter greater than that of the oxygen supplying member 200 and a part of the oxygen supplying member 200 is inserted within the air cooling member 300.

While the oxygen supplying member 200 is inserted within the air cooling member 300, the oxygen supplying member 200 and the air cooling member 300 are connected to each other by using a plurality of connection units 500.

The air cooling member 300 is formed to have an upper portion that is open and a lower portion that is closed by a closing unit 310 such that the outside air is entered through the open upper portion thereof.

The air introduced to the air cooling member 300 is circulated to cool the oxygen supplying member 200 inserted within the melting furnace 100.

Accordingly, the oxygen supplying member 200 may maintain durability by using the air cooling member 300 even in an extreme circumstance of high temperature.

A fixing member 400 is mounted and fixed to an upper portion of the melting furnace 100 and is provided at an outer surface of the air cooling member 300.

The fixing member 400 comprises an upper fixing member 410 and a lower fixing member 420 and is provided to surround the outer surface of the air cooling member 300.

The lower fixing member 420 is mounted on the upper portion of the melting furnace 100 and the lower fixing member 420 is fixed to the melting furnace 100 by welding.

The upper fixing member 410 is mounted on an upper portion of the lower fixing member 420, and a separate fixing bolt B is rotated to securely fix the upper fixing member 410 to the lower fixing member 420.

O-ring, which is designated by a reference character "O" in FIG. 1, is interposed between the upper fixing member 410 and the lower fixing member 420 to maintain sealing within the melting furnace 100.

Accordingly, the air cooling member 300 is securely fixed by the fixing member 400.

The oxygen supplying member 200 is supported by using a plurality of the connection units 500 positioned between the oxygen supplying member 200 and the air cooling member 300.

As shown in FIG. 2, by using the connection unit 500, the air cooling member 300 and the oxygen supplying member 200 inserted within the air cooling member 300 are separated from each other to maintain a predetermined interval therebetween.

The connection unit 500 is formed in a shape of a cylinder or a wide plate and is fixed to an inner surface of the air cooling member 300 and the outer surface of the oxygen supplying member 200.

Thus, a predetermined interval is maintained between the oxygen supplying member 200 and the air cooling member 300 by the connection unit 500 so that cooling by the air cooling member 300 is efficiently performed.

A condition of use and an operation of the oxygen supplying apparatus of the melting furnace that is configured as described above according to the present invention are described below.

First, as shown in FIGS. 1 and 2, the melting furnace 100 containing the waste to be vitrified, the oxygen member 200, and the air cooling member 300 are standardized and modularized in a factory beforehand, thereby improving work efficiency at a work site.

The melting furnace 100 containing the waste includes the air cooling member 300 provided in the through hole 110 formed on the melting furnace 100 and the oxygen supplying member 200 that is modularized within the air cooling member 300.

The fixing member 400 is mounted on the upper portion of the melting furnace 100 and surrounds the outer surface of the air cooling member 300.

The fixing member 400 is mounted on the melting furnace 100 and is fastened to the melting furnace 100 by using the separate fixing bolt B.

By supplying oxygen into the melting furnace 100 that is assembled as above, the waste may be efficiently melted.

According to the present invention, cooling is performed by an air cooling provided outside the air supplying apparatus, and thus the waste may be melted during a longer period by using the durability of the oxygen supplying apparatus.

Also, economic damage due to wear and tear may be minimized by using a simplified structure, thereby improving reliability.

In the above, although the embodiments of the present invention have been described with reference to the accompanying drawings, a person skilled in the art should apprehend that the present invention can be embodied in other specific forms without departing from the technical spirit or essential characteristics thereof. Thus, the embodiments described above should be construed as exemplary in every aspect and not limiting.

What is claimed is:

1. An oxygen supplying apparatus of a melting furnace, the oxygen supplying apparatus comprising:
    a through hole formed in a wall of the melting furnace;
    an air cooling member having a pipe shape, passing through the through hole and extending inside and outside the melting furnace, the air cooling member having a first end and a second end, the first end being open to an outside of the melting furnace and allowing an outside air to enter into the air cooling member, the second end being closed in an inside of the melting furnace;
    an oxygen supplying member having a pipe shape and passing through the air cooling member, the oxygen supplying member being longer than the air cooling member and having a first end and a second end, the first end of the oxygen supplying member being open to introduce oxygen and extended out from the first end of the air cooling member, the second end of the oxygen supplying member being open to the inside of the melting furnace and extended out from the second end of the air cooling member, thereby allowing the oxygen to enter into the melting furnace;
    a plurality of connection units positioned between the air cooling member and the oxygen supplying member, the plurality of connection units fixing the oxygen supplying member in the air cooling member;
    a closing unit provided in the second end of the air cooling member, the closing unit closing an inside end of a space between an inner surface of the air cooling member and an outer surface of the oxygen supplying member such that the outside air entered into the space through the first end of the air cooling member circulates in the space;

a lower fixing member mounted on an outer surface of the melting furnace, fixed on the outer surface of the melting furnace by a welding and having a hole in a center, the hole of the lower fixing member having a diameter greater than a diameter of the air cooling member such that an outer surface of the air cooling member does not directly contact with the inner surface of the hole of the lower fixing member, the hole of the lower fixing member being arranged to have the same central axis with the through hole of the melting furnace; and an upper fixing member mounted on the lower fixing member, fixed on the lower fixing member by a bolt and having a hole in a center, the upper fixing member fixing the air cooling member in the hole of the upper fixing member;

a ring interposed between the lower fixing member and the upper fixing member to seal the melting furnace, wherein a diameter of the through hole of the wall of the melting furnace is greater than the diameter of the air cooling member such that the outer surface of the air cooling member does not directly contact with the inner surface of the through hole of the wall of the melting furnace, and wherein the space between the inner surface of the air cooling member and the outer surface of the oxygen supplying member includes only the connection units, and the oxygen supplying member includes nothing thereinside.

* * * * *